(12) United States Patent
Krull et al.

(10) Patent No.: US 6,776,279 B2
(45) Date of Patent: Aug. 17, 2004

(54) UNIT FOR AUTOMATIC CONTAINER RETURNS SYSTEMS

(75) Inventors: Hans-Peter Krull, Lubbecke (DE); Siegmar Hecht, Ilmenau (DE); Dieter Beyer, Friedersdorf (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 10/416,060

(22) PCT Filed: Nov. 7, 2001

(86) PCT No.: PCT/DE01/04142
§ 371 (c)(1),
(2), (4) Date: May 7, 2003

(87) PCT Pub. No.: WO02/39393
PCT Pub. Date: May 16, 2002

(65) Prior Publication Data
US 2004/0040822 A1 Mar. 4, 2004

(30) Foreign Application Priority Data

Nov. 7, 2000 (DE) .......................................... 100 55 208
Nov. 7, 2000 (DE) .......................................... 100 55 206

(51) Int. Cl.[7] .............................. B65G 15/20; B07C 5/02
(52) U.S. Cl. ................... 198/626.5; 198/626.1; 198/626.3; 209/538; 209/618; 209/622
(58) Field of Search ................... 198/626.1, 626.2, 198/626.3, 626.5, 379, 395, 370.07; 209/538, 618, 622, 624

(56) References Cited

U.S. PATENT DOCUMENTS

| | | | | |
|---|---|---|---|---|
| 5,048,326 A | * | 9/1991 | Toida et al. | 73/105 |
| 5,150,307 A | * | 9/1992 | McCourt et al. | 700/223 |
| 5,161,661 A | * | 11/1992 | Hammond | 194/209 |
| 5,361,913 A | * | 11/1994 | Melchionna | 209/583 |
| 5,434,428 A | * | 7/1995 | Paladini | 250/559.24 |
| 5,641,072 A | * | 6/1997 | Otake | 209/524 |
| 5,934,440 A | * | 8/1999 | Kroghrud | 194/212 |
| 6,170,637 B1 | * | 1/2001 | Ishii | 198/443 |
| 6,431,343 B1 | * | 8/2002 | Lehtola et al. | 198/413 |
| 6,554,122 B2 | * | 4/2003 | Auno et al. | 198/369.3 |
| 6,678,578 B2 | * | 1/2004 | Holmen et al. | 700/223 |

FOREIGN PATENT DOCUMENTS

| | | |
|---|---|---|
| WO | PCT/NO97/00180 | 1/1998 |
| WO | PCT/NO01/00329 | 2/2002 |

* cited by examiner

*Primary Examiner*—Douglas Hess
(74) *Attorney, Agent, or Firm*—Synnestvedt Lechner & Woodbridge, LLP; Thomas J. Onka, Esq.

(57) ABSTRACT

The invention described here concerns a unit for automatic container returns systems, with a conveyor device for transporting the containers in the direction of their longitudinal axis, with two rotary-driven rollers arranged along the conveyor path and which can be transferred from a neutral position into an identification position in which they release the container from the conveyor device and rotate said container, and with a sorting means for the selective, lateral removal of the container from the conveyor device according to the identification. It is the object of the invention to provide a generic unit for automatic container returns systems that is characterised by a simple construction. This object is achieved in that the two rollers (1, 2; 17, 18) act as a sorting mechanism by way of their being transferred transverse to the conveyor path into a sorting position in which the lateral distance between one or other of the rollers (1, 2; 17, 18) and the conveyor path is so large that the container (8, 14) can drop down between the conveyor path and the respective roller (1, 2; 17, 18) displaced sideways.

10 Claims, 6 Drawing Sheets

UNIT FOR AUTOMATIC CONTAINER RETURNS SYSTEMS

CROSS REFERENCE TO RELATED APPLICATIONS

This application claims the priority of PCT Application No. PCT/DE01/04142 filed Nov. 7, 2001 and German applications DE 100 55 206.4 filed Nov. 7, 2000 and DE 100 55 208.0 filed Nov. 7, 2000.

BACKGROUND OF THE INVENTION

1. Field of the Invention

The invention relates to a unit for automatic container returns systems, e.g. for cans and bottles made of glass, plastic or metal, in which the containers are transported in the horizontal position by a conveyor device to an identification station in which the characteristic data of the containers is ascertained and in which the further treatment of the containers is determined, e.g. whether they are to be rejected for removal from the conveyor device or, if appropriate, transported to another unit.

2. Description of the Prior Art

A unit for automatic container returns systems is known from WO 98/02853. In this the conveyor device comprises a group of parallel belts spanning between two pulleys. Said belts form a diabolo shape in cross-section so that the group of belts forms a V-shaped configuration on the top in which the container to be conveyed is located. A roller extending roughly the length of the conveyer path is positioned on both sides and alongside the conveyor path, with each roller being attached to the end of a pivoting lever. The rollers are equipped with a drive to rotate them and by means of a pivoting movement are moved towards each other and into contact with the container at the identification station, thereby lifting said container and simultaneously causing it to rotate so that specific data, e.g. in the form of a barcode, on the outside of the container and rotating with the container can be detected by an identification unit, even when it was previously not in the "field of view" of the identification unit. In doing so, depending on the result of the identification process, a decision is made as to what should happen to the container next, e.g. whether it is to be rejected sideways from the conveyor device, or whether it is to be transported to the next unit in order to be compacted or treated in some other way there. In the known unit a pivoting mechanism driven by a motor is provided above the conveyor device for the sideways ejection, whereby said mechanism grips the container transported on the conveyor device and pushes this out of the conveyor device, if necessary by way of a pivoting movement to one side or the other.

SUMMARY OF THE INVENTION

The invention is based on a unit for automatic container returns systems with a conveyor device for transporting the containers in the direction of their longitudinal axis, two rotary-driven rollers arranged along the conveyor path, which can be transferred from a neutral position into an identification position in which they release the container from the conveyor device and rotate said container, and a sorting means for the selective, lateral removal of the container from the conveyor device depending on the identification.

It is the object of the invention to provide a generic unit for automatic container returns systems that is characterised by a simple construction.

This object is achieved with the generic unit according to the invention in that the two rollers act as a sorting means by way of their being transferred transverse to the conveyor path into a sorting position in which the lateral distance between one or other of the rollers and the conveyor path is so large that the container can drop down between the conveyor path and the respective roller displaced sideways.

The unit according to the invention has the advantage that no separate sorting device and its associated drive are required because the rollers provided for the identification function simultaneously carry out the sorting function.

In an advantageous arrangement of the invention it is the case that the conveyor device comprises two endless conveyor belts, each of which forms a common element with one of the rollers, that the conveyor belts simultaneously act as lateral guides for the containers transported on them when the rollers are in the neutral position, and that the elements consisting of roller and transport belt can be transferred into the sorting position.

In doing so it is the case that each conveyor belt passes over guide pulleys mounted in a frame, which is fitted such that it can rotate about the axis of the associated roller, and that the rotary drive for the rollers consists of a driven shaft positioned between said rollers, whereby the rollers are in contact with said shaft under a certain pretension. The advantage of this arrangement is that no form of drive needs to be provided in the rollers themselves.

To this end, each conveyor belt passes around guide pulleys positioned at the four corners of a rectangle and whose spacings relative to each other are such that the associated roller can project sideways by a prescribed dimension into the space enclosed by the conveyor belt. In another advantageous arrangement of this embodiment of the invention it is the case that the supports for the transport belts can be rotated from the neutral position—in which the transport belts form a V-shaped channel for carrying the container—about the axes of the rollers in opposing directions into the identification position so that the container is released from the transport belts and transferred onto the rotating rollers, and that the elements consisting of roller plus conveyor belt can be moved away from each other into the sorting position.

In a further advantageous arrangement of the invention it is the case that the conveyor device consists of a narrow endless conveyor belt, in which the rollers—when in the neutral position—serve as lateral guides for the container being transported on the narrow conveyor belt.

In a practical arrangement of the invention it is the case that a driven shaft running in the conveying direction is provided between the upper strand of the conveyor belt and its lower strand, and that the rollers are fitted to the free ends of pivoting levers whose pivoting movement either moves the rollers towards each other from the neutral position into the identification position, in which they operate with the driven shaft, lift the container from the conveyor belt and rotate it, or away from the conveyor belt into the sorting position.

The advantage of this arrangement is that the rollers attached to the levers do not require their own drive.

In an advantageous arrangement of the invention it is the case that means are provided for pre-tensioning the levers carrying the rollers in the direction of the driven shaft, and releasable locking mechanism that holds the levers in a neutral position against the force of the means of pre-tensioning.

A form of drive is preferably assigned to the levers carrying the rollers through which the levers can be pivoted out of the sorting position against the force of the means of pre-tensioning if required. The form of drive here can consist of motors or solenoids.

BRIEF DESCRIPTION OF THE DRAWINGS

The invention is described in more detail in the following by means of the practical examples illustrated in the drawing. The associated drawing shows.

DETAILED DESCRIPTION OF THE PREFERRED EMBODIMENT

Figure 1:
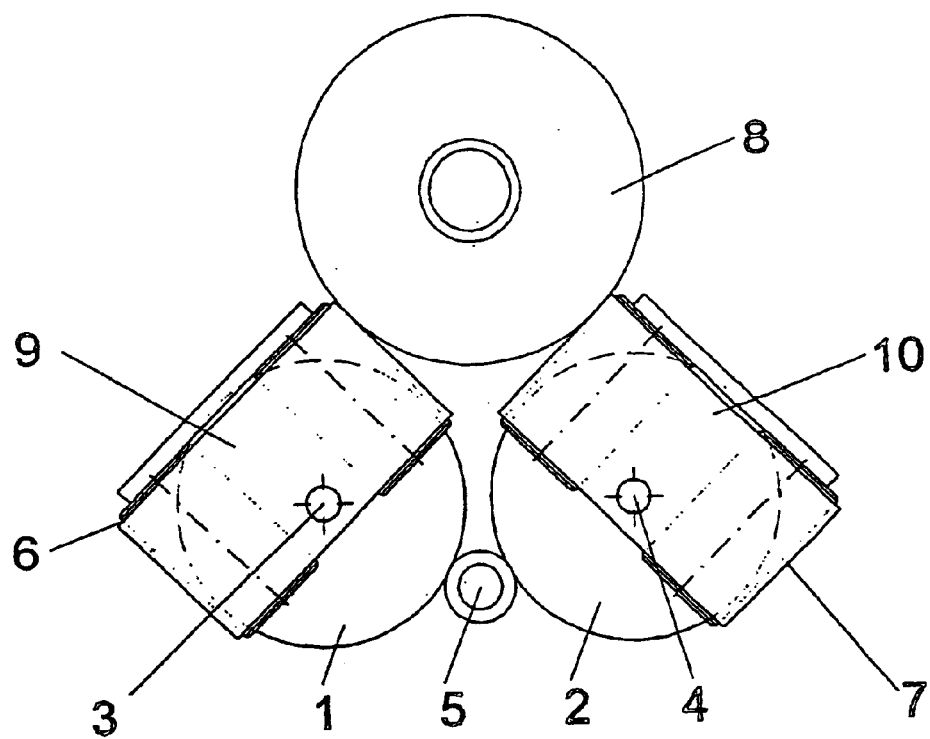
FIG. 1 a schematic end view of the form of drive for the unit in the neutral position for the transport of the container in a first embodiment of the invention.
Figure 5:
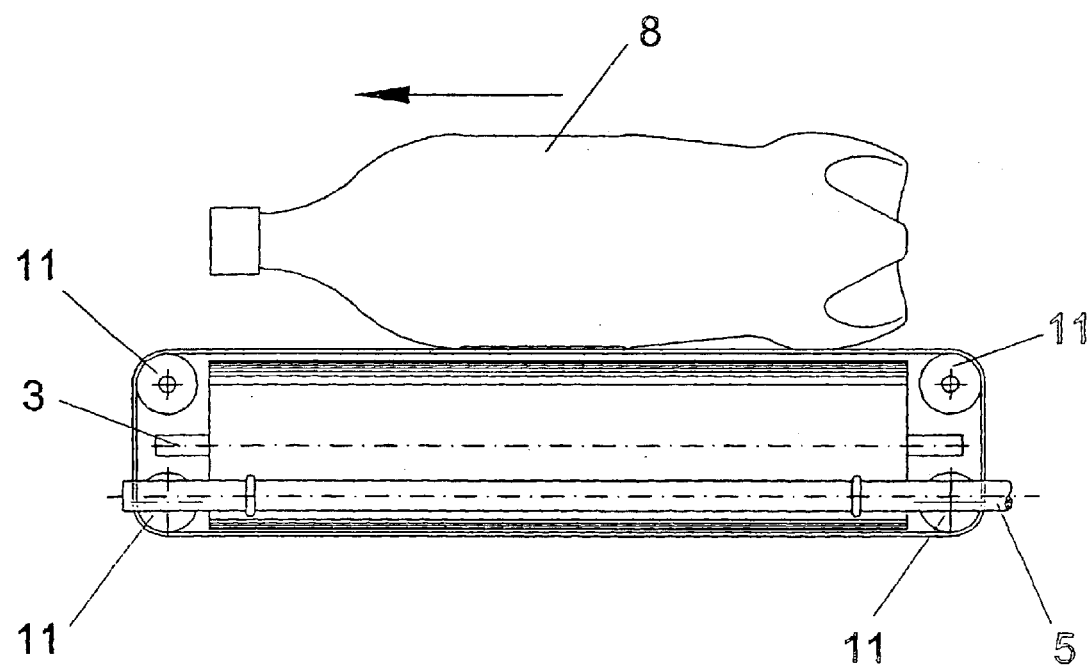
FIG. 5 a side elevation of the drive arrangement of the unit.

FIG. 1 is an end view showing two rollers 1 and 2 of a unit for automatic container returns systems according to the invention, whereby said rollers can be rotated about axes 3 and 4 and by a driven shaft 5, with which they make contact with a pretension, in the way of a friction wheel drive. Each axis 3 and 4 carries a rotating frame 9 and 10 respectively, supporting a system of four guide pulleys 11 (FIG. 5) over which an endless conveyor belt 6 or 7 passes. Frames 9 and 10, rollers 1 and 2, guide pulleys 11 and conveyor belts 6 and 7 each form a common element. A means of control—not illustrated—holds rollers 1 and 2 in the neutral position shown in FIG. 1 in which conveyor belts 6 and 7 project beyond rollers 1 and 2 and form a V-shaped configuration for guiding a container 8 to be transported. The vertical distances between the four guide pulleys 11 are of such a size that the associated roller 1 or 2 can project by a prescribed dimension into the space enclosed by the conveyor belt 6 or 7. This dimension amounts to slightly more than half the cross-sectional area of roller 1 or 2 in the practical example shown here. This allows part of the circumference of roller 1 or 2 to remain exposed and make contact with the shaft 5.

Figure 2:
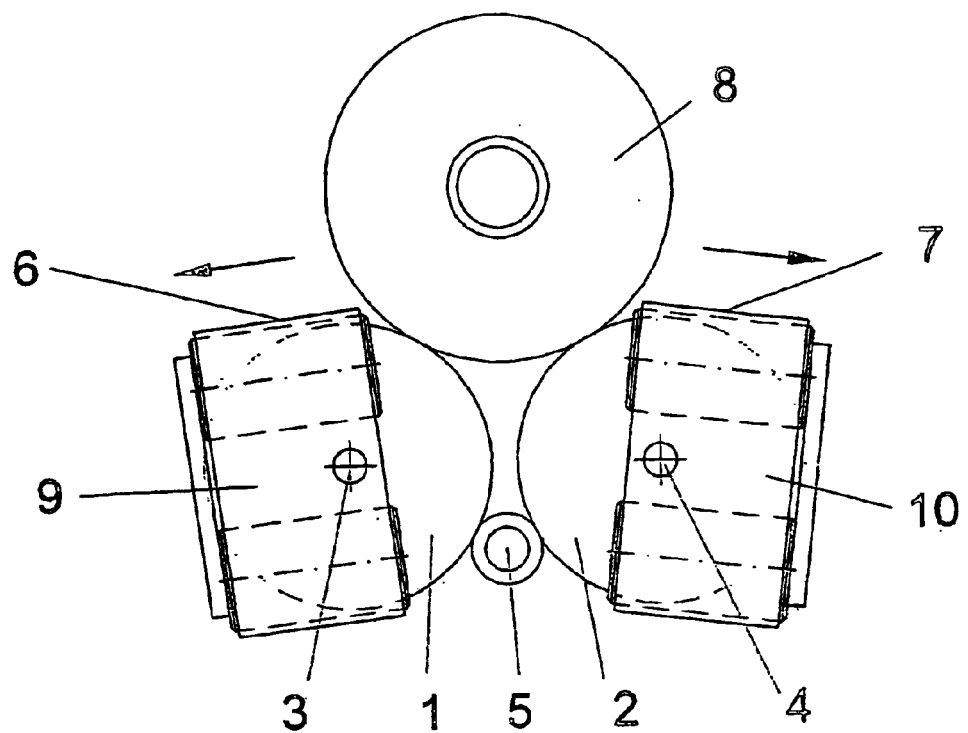
FIG. 2 the arrangement of FIG. 1 in the identification position.
Figure 3:
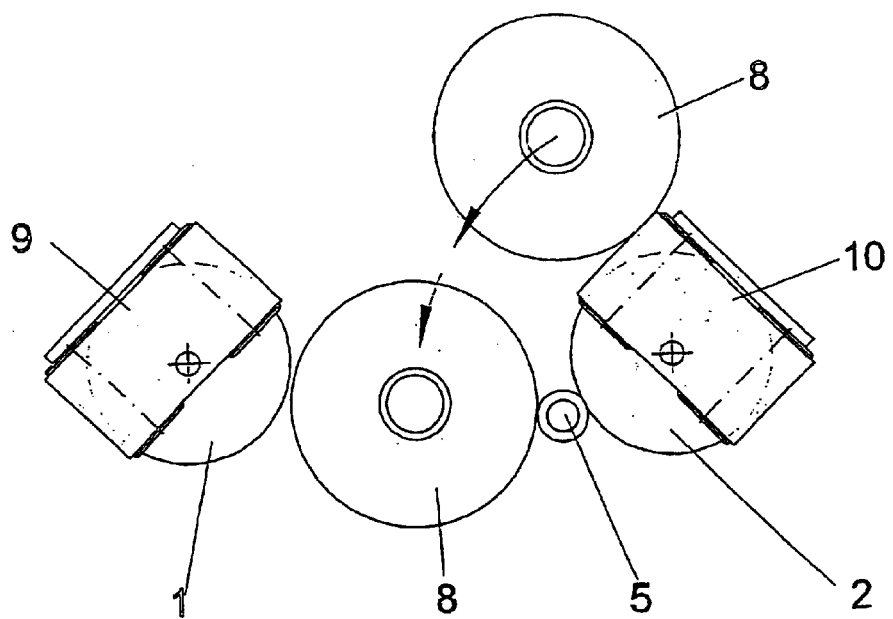
FIG. 3 the arrangement of FIG. 1 in the sorting position for ejecting the container to the left.
Figure 4:
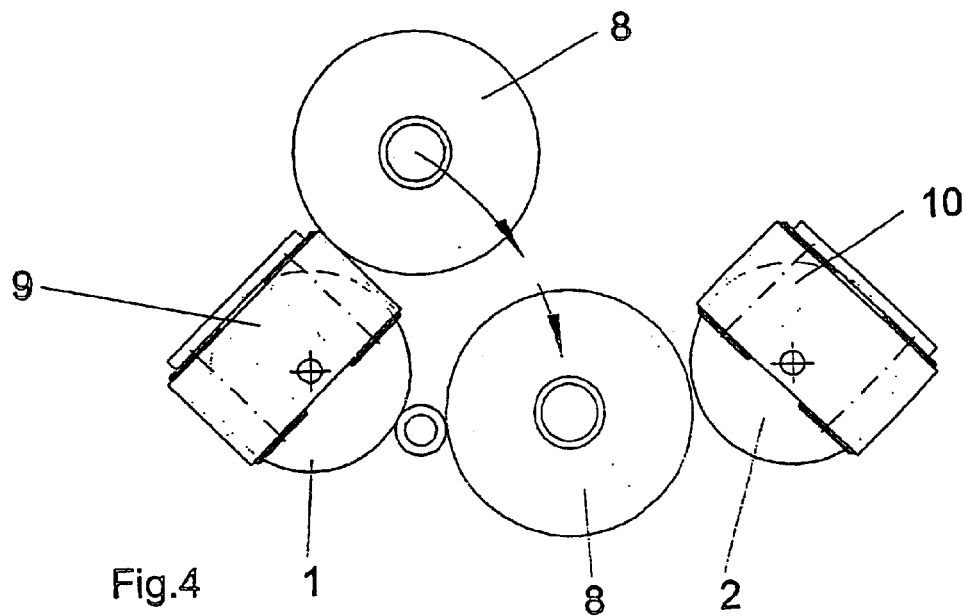
FIG. 4 the arrangement of FIG. 1 in the sorting position when ejecting the container to the right.

FIG. 2 shows the drive arrangement of FIG. 1 in the identification position. Here, frames 9 and 10 have rotated with conveyor belts 6 and 7 in opposing directions about axes 3 and 4 to such an extent that conveyor belts 6 and 7 have moved clear of the container 8 and the exposed part of the circumference of rollers 1 and 2 operates with the container 8. This means that the container 8 is rotated by rollers 1 and 2 driven by the shaft 5 so that an identification code, e.g. a barcode, attached to the container can be read and evaluated by a reading device—not illustrated—above the container 8.

When it is established in the identification station that the container can be accepted into the returns system, the arrangement shown in FIG. 2 returns to the position shown in FIG. 1 and the container is passed to the next station.

However, if the identification station has established that the bottle is of a non-returnable type, the right or left roller 1 or 2 with the frame 9 or 10, the conveyor belt 6 or 7 and the guide pulleys 11 are moved outwards as one unit to such an extent that the distance between roller 1 or 2 and the driven shaft 5 increases to such an extent that the container 8 can fall out to the left or the right side and hence be rejected from the conveyor device.

Figure 6:
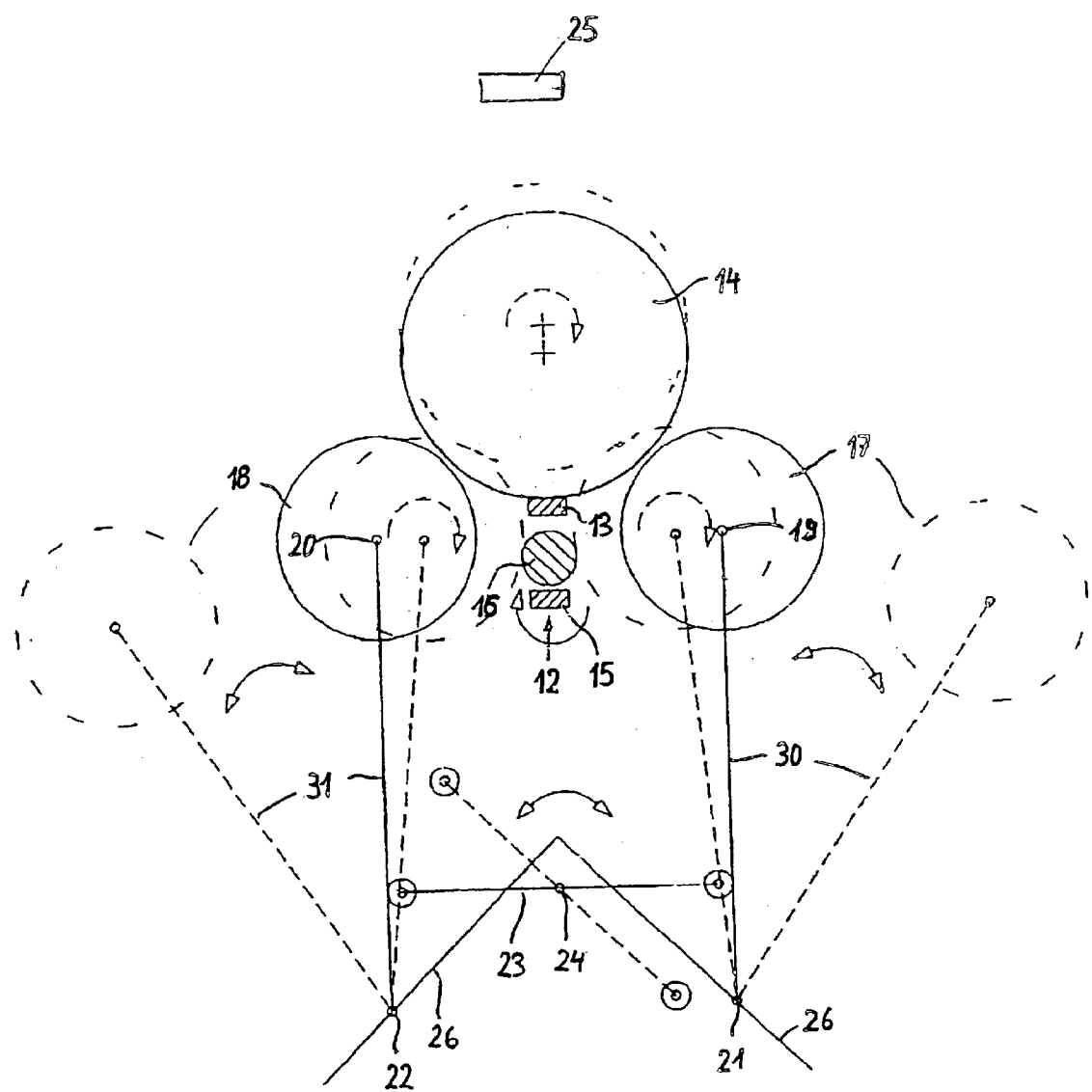
FIG. 6 a schematic end view of the adjusting mechanism of a unit for automatic container returns systems according to the invention and according to a second embodiment of the invention.
Figure 7:
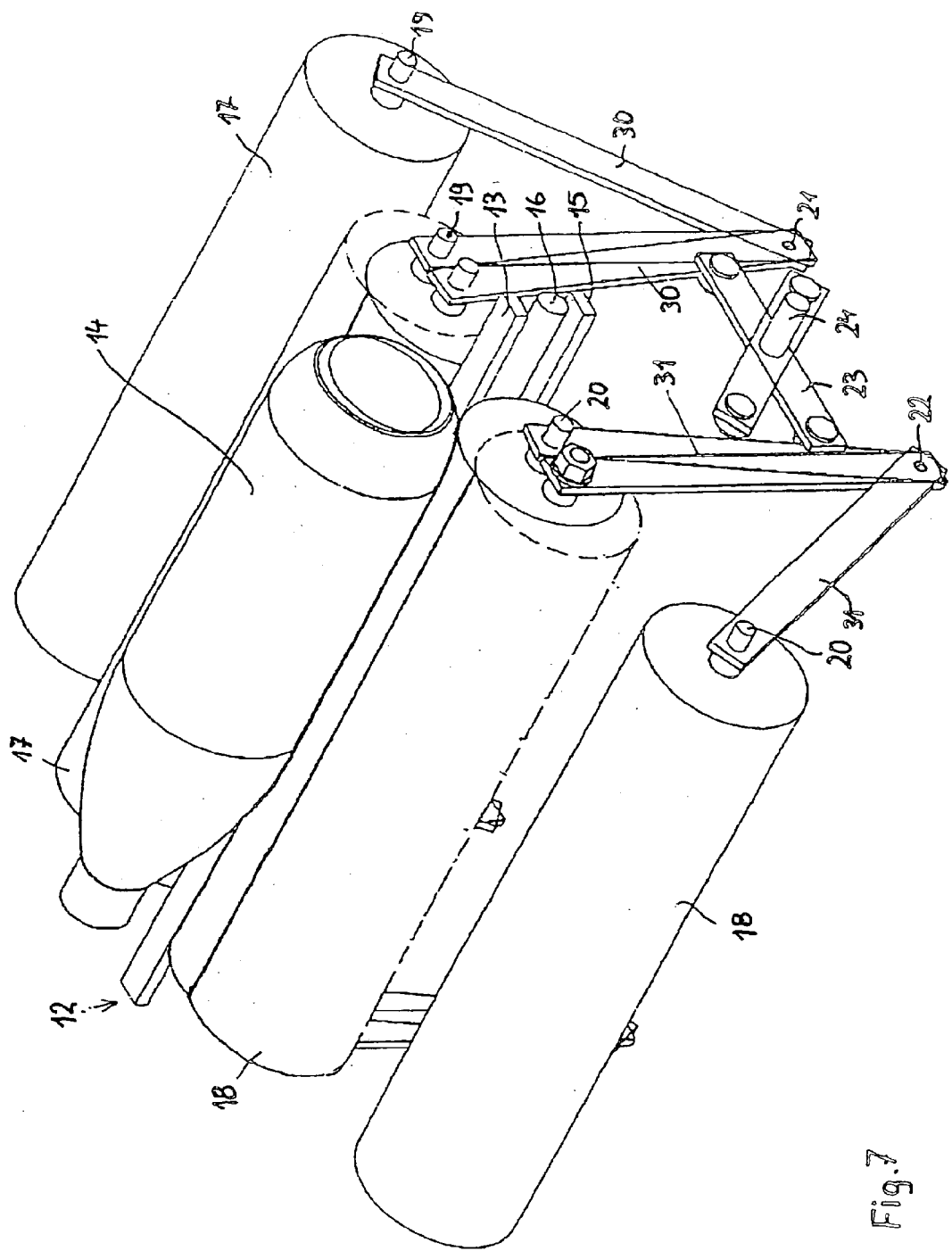
FIG. 7 a schematic perspective view of the arrangement in FIG. 6.
Figure 8:
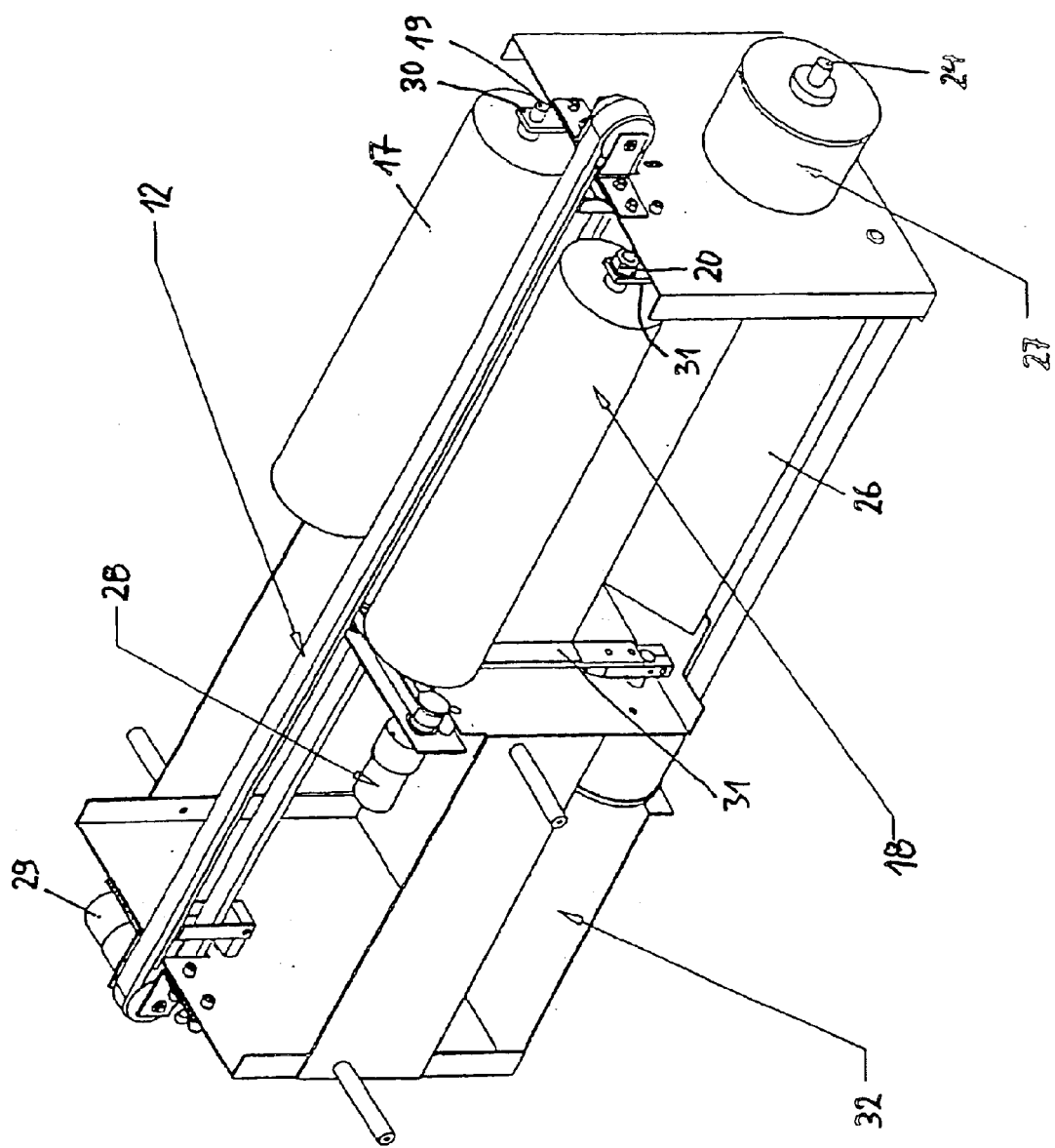
FIG. 8 a schematic perspective view of a unit with the mechanism of FIGS. 6 and 7.

A further embodiment of the invention is illustrated in FIGS. 6 to 8.

FIG. 6 shows a narrow endless conveyor belt 12 positioned in an—otherwise not illustrated—automatic container returns system for empty drinks containers. Containers 14, e.g. empty bottles or cans, are transported perpendicular to the plane of the paper on the upper strand 13 of the conveyor belt 12. A driveable shaft 16, whose axis runs in the conveying direction, is located in the intervening space between the upper strand 13 and the lower strand 15 of the conveyor belt 12. A roller 17 or 18 is provided on each side of the conveyor belt 12. The rotary axes 19, 20 of rollers 17 and 18 also run in the conveying direction and are preferably longer than the containers 14 being transported. Rollers 17 and 18 in the practical example shown here are mounted such that they can rotate on the free ends of levers 30 or 31, whose other ends can be rotated about pivots 21 or 22 on the housing of the unit.

When a container 14 is transported on the conveyor belt 12, rollers 17 and 18 are located in the fully extended neutral position in which they do not rotate about their axes 19, 20 and in which they prevent the container 14 tipping sideways off the conveyor belt 12. Pretensioning means—not illustrated—, e.g. springs, act on levers 30 and 31, which attempt to move rollers 17 and 18 towards each other. They are prevented from doing so by adjustable stops. The stops in the practical example shown here consist of a lever 23 rotating about a central axis 24.

When the container 14 has reached the identification position, the lever 23 rotates about the axis 24 into the position shown by the dotted lines so that levers 30 and 31 pivot towards each other under the action of the pretension until they reach the position indicated by the dotted lines, where they now make contact with the driven shaft 16, simultaneously come into contact with the container 14 and lift this into the position shown by the dotted lines so that this is raised clear of the conveyor belt 12 and rests on rollers 17 and 18, which now, as they are being turned by the shaft 16 in the way of a friction wheel drive, transfer this rotation to the container 14. This rotational movement of the container 14 activates an overhead reading device 25, e.g. a barcode laser, which ascertains the barcode or other means of identification, which contains specific data about the container 14, e.g. whether it is a plastic or glass bottle or a metal can, whether the container 14 can be recycled, etc., attached to the outside of the container 14. An evaluation unit connected to the reading device 25 then determines what should happen to the container 14 next, e.g. whether it should be returned to the entry position or transported to a subsequent conveyor unit, or whether it should be rejected immediately from the identification station.

When the decision of the evaluation unit connected to the reading device 25 is that rejection should take place, either lever 30 or lever 31 is pivoted away from the shaft 16 into the sorting position indicated by the dotted lines so that a large gap forms between the conveyor belt 12 and the respective roller 17 or 18 pivoted outwards such that the container 14 can fall out to the right or the left, where it strikes a guide device 26 that feeds it to a storage container or other form of treatment. Solenoids—not illustrated—are provided for driving levers 30, 31 into their sorting position.

FIG. 7 shows a perspective view of the device shown in FIG. 6, with the three possible positions of rollers 17 and 18 being illustrated here as well.

FIG. 8 is a schematic view of parts of the unit 32 with the drive mechanism illustrated in FIGS. 6 and 7. The pivoting movement of levers 30 and 31 is achieved here by a solenoid 27. Also indicated are a drive means 28 for the shaft 16 not visible in this view and a drive means 29 for the conveyor belt 12.

While the invention has been described with reference to the preferred embodiment thereof, it will be appreciated by those of ordinary skill in the art that modifications can be made to the parts that comprise the invention without departing from the spirit and scope thereof.

What is claimed is:

1. Unit for automatic container returns systems, with a conveyor device for transporting the containers in the direction of their longitudinal axis, with two rotary-driven rollers arranged along the conveyor path and which can be transferred from a neutral position into an identification position in which they release the container from engagement with the conveyor device and rotate said container, and with a sorting means for the selective, lateral removal of the container from the conveyor device according to the identification, characterised in that the two rollers (1, 2; 17, 18) act as a sorting means by way of their being transferred transverse to the conveyor path into a sorting position in which the lateral distance between one or other of the rollers (1, 2; 17, 18) and the conveyor path is so large that the container (8, 14) can drop down between the conveyor path and the respective roller (1, 2; 17, 18) displaced sideways.

2. Unit according to claim 1, characterised in that the conveyor device comprises two endless conveyor belts (6, 7), each of which forms a common element with one of the rollers (1, 2), that the conveyor belts (6, 7) simultaneously serve as lateral guides for the containers (8) being transported on them when the rollers (1, 2) are in the neutral position, and that the elements consisting of rollers (1, 2) and conveyor belts (6, 7) can be transferred into a sorting position.

3. Unit according to claim 2, characterised in that each conveyor belt (6, 7) passes over guide pulleys (11) mounted in a frame (9, 10), that the frame (9, 10) is mounted on the axis (3, 4) of the associated roller (1, 2) such that it can rotate, and that the rotary drive for the rollers (1, 2) consists of a driven shaft (5) located between them and with which the rollers (1, 2) make contact under a pretension.

4. Unit according to claim 3, characterised in that each conveyor belt (6, 7) passes over four guide pulleys (11) located at the corners of a rectangle and whose spacing relative to each other is such that the associated roller (1, 2) can project by a prescribed dimension into the space enclosed by the conveyor belt (6, 7).

5. Unit according to claim 4, characterised in that the frames (9, 10) for the conveyor belts (6, 7) can be pivoted from the neutral position, in which the conveyor belts (6, 7) form a V-shaped channel for carrying the container (8), about the axes (3, 4) of the rollers (1, 2) in opposing directions into the identification position to such an extent that the container (8) is moved clear of the conveyor belts and onto the rotating rollers (1, 2), and that the elements consisting of roller (1, 2) and conveyor belt (6, 7) can be moved away from each other into the sorting position.

6. Unit according to claim 1, characterized in that the conveyor device consists of a narrow endless conveyor belt (12), in which the rollers (17, 18)—when in the neutral position—serve as lateral guides for the container (14) being transported on the narrow conveyor belt (12).

7. Unit according to claim 6, characterised in that a driven shaft (16) running in the conveying direction is provided between an upper strand (13) of the conveyor belt (12) and its lower strand (15), and that the rollers (17, 18) are fitted to free ends of pivoting levers (30, 31) whose pivoting movement either moves the rollers (17, 18) towards each other from the neutral position into the identification position, in which they operate with the driven shaft (16), lift the container (14) from the conveyor belt (12) and rotate it, or away from the conveyor belt (12) into the sorting position.

8. Unit according to claim 7, characterised in that means are provided for pre-tensioning the levers (30, 31) carrying the rollers (17, 18) in the direction of the driven shaft (16), and releasable locking mechanism (23) that holds the levers (30, 31) in a neutral position against force of the means of pre-tensioning.

9. Unit according to claim 8, characterised in that the levers (30, 31) carrying the rollers (17, 18) are associated with drive means through which the levers (30, 31) can be pivoted out of the sorting position against the force of the means of pre-tensioning.

10. Unit according to claim 9, characterised in that the drive means consist of motor driven belt drives or solenoids.

* * * * *